(12) United States Patent
Borntrager et al.

(10) Patent No.: US 10,472,006 B2
(45) Date of Patent: Nov. 12, 2019

(54) POWERED HAND TRUCK WITH PIVOTING TRACKS

(71) Applicants: Steven Borntrager, Grayson, KY (US); James Borntrager, Carrier Mills, IL (US)

(72) Inventors: Steven Borntrager, Grayson, KY (US); James Borntrager, Carrier Mills, IL (US)

( * ) Notice: Subject to any disclaimer, the term of this patent is extended or adjusted under 35 U.S.C. 154(b) by 164 days.

(21) Appl. No.: 15/701,255

(22) Filed: Sep. 11, 2017

(65) Prior Publication Data

US 2018/0072356 A1 Mar. 15, 2018

Related U.S. Application Data

(60) Provisional application No. 62/393,588, filed on Sep. 12, 2016.

(51) Int. Cl.
| | |
|---|---|
| *B62D 55/084* | (2006.01) |
| *B62D 51/04* | (2006.01) |
| *B66F 9/065* | (2006.01) |
| *B66F 9/075* | (2006.01) |
| *B62D 51/02* | (2006.01) |

(52) U.S. Cl.
CPC ........... *B62D 55/084* (2013.01); *B62D 51/02* (2013.01); *B66F 9/065* (2013.01); *B66F 9/07577* (2013.01)

(58) Field of Classification Search
CPC .... B62D 55/08; B62D 55/104; B62D 51/007; B66F 9/0757; B66F 9/07577; B62B 2301/256

USPC ........................ 180/9.32, 9.22, 9.5; 280/5.22
See application file for complete search history.

(56) References Cited

U.S. PATENT DOCUMENTS

| | | | | |
|---|---|---|---|---|
| 1,135,187 A | * | 4/1915 | Jett ..................... | B62D 55/0842 180/9.54 |
| 1,331,550 A | * | 2/1920 | Wishon .................. | B62D 55/02 180/9.54 |
| 1,916,375 A | * | 7/1933 | Knickerbocker ...... | B62M 27/02 180/192 |

(Continued)

FOREIGN PATENT DOCUMENTS

| | | |
|---|---|---|
| CA | 2 488 123 A1 | 5/2006 |
| EP | 2 239 182 A1 | 10/2010 |

OTHER PUBLICATIONS

"Orbit Lift Pruning Towers." http://www.gillisons.com/47/gvf-equipment/orbit-lift-pruning-towers (Acces on Aug. 17, 2016) 3pgs.

*Primary Examiner* — Anne Marie M Boehler
(74) *Attorney, Agent, or Firm* — Richard C. Litman; Nath, Goldberg & Meyer

(57) ABSTRACT

The powered hand truck with pivoting tracks includes a chassis containing the components for general operation. A common pivot axle extends through the chassis and a pair of tracks is pivotally attached to opposite ends of the common pivot axle. This connection to the pivot axle permits each track to pivot passively with respect to the chassis independently of the other. An extendable control arm has one end attached to each opposing side of the chassis and an opposing end attached to a corresponding track. The control arm controls the extent of pivoted positioning of the connected track to dampen pivoting of the corresponding track within a predetermined range.

18 Claims, 4 Drawing Sheets

(56) References Cited

U.S. PATENT DOCUMENTS

| | | | | |
|---|---|---|---|---|
| 3,289,779 | A | * | 12/1966 | Feucht ................. B62D 55/116 180/41 |
| 3,417,832 | A | * | 12/1968 | Ziccardi ................. B62D 55/04 180/9.3 |
| 3,489,236 | A | * | 1/1970 | Goodwin ............... B62D 55/06 180/8.1 |
| 4,411,330 | A | * | 10/1983 | Blokland ............... A61G 5/061 180/198 |
| 4,953,919 | A | * | 9/1990 | Langford ............... B62D 55/06 305/131 |
| 4,966,242 | A | | 10/1990 | Baillargeon |
| 5,647,721 | A | * | 7/1997 | Rohrbaugh ............. E02F 3/286 180/9.1 |
| 6,164,399 | A | * | 12/2000 | Bays ................. B62D 55/0655 180/9.21 |
| 6,832,659 | B1 | * | 12/2004 | Bares ................... B62D 55/084 180/19.1 |
| 6,926,108 | B1 | * | 8/2005 | Polakowski ........... B62M 27/02 180/190 |
| 7,597,522 | B2 | | 10/2009 | Borntrager et al. |
| 8,007,221 | B1 | * | 8/2011 | More ...................... B25J 5/005 180/9.32 |
| 8,851,824 | B2 | * | 10/2014 | Pallanich ................ B60P 3/125 414/469 |
| 9,796,435 | B1 | * | 10/2017 | Reyes .................... B62D 55/06 |
| 2005/0061557 | A1 | | 3/2005 | Brazier |
| 2009/0050379 | A1 | * | 2/2009 | Albright ............ B62D 33/0604 180/9.54 |
| 2011/0163588 | A1 | * | 7/2011 | Burt .................... B62D 51/007 298/17 R |
| 2013/0006444 | A1 | | 1/2013 | Keeling et al. |
| 2015/0307144 | A1 | | 10/2015 | Gustafson |
| 2015/0321709 | A1 | | 11/2015 | Sewell |

\* cited by examiner

POWERED HAND TRUCK WITH PIVOTING TRACKS

CROSS-REFERENCE TO RELATED APPLICATION

This application claims the benefit of U.S. Provisional Patent Application Ser. No. 62/393,588, filed Sep. 12, 2016.

BACKGROUND

1. Field

The present invention relates to generally small powered lifting and transport devices, and particularly to a powered hand truck with pivoting tracks to enhance traversal over uneven terrain.

2. Description of the Related Art

Many lift and transport devices exist as an aid for users to carry bulky and often heavy objects from one location to another. One such example is disclosed in U.S. Pat. No. 7,597,522, issued to Borntrager et al., which is hereby incorporated by reference in its entirety. The powered hand truck disclosed by Borntrager et al. includes a prime mover mounted to a chassis, the prime mover actuating drive wheels and powering a forklift mechanism. Although this type of hand truck performs well, the two-wheeled design tends to have issues traversing uneven terrain stably while supporting the object being moved.

Thus, a powered hand truck with pivoting tracks solving the aforementioned problems is desired.

SUMMARY

The powered hand truck with pivoting tracks includes a chassis containing the components for general operation. A common pivot axle extends through the chassis and a pair of tracks is independently coupled to opposite ends of the common pivot axle. This connection to the pivot axle enables each track to pivot with respect to the chassis independently of the other. An extendable control arm has one end coupled to each opposing side of the chassis and an opposing end coupled to a corresponding track. The control arm controls the extent of pivotal positioning of the connected track to insure the track pivots within a predetermined range. The extended position of the control arm may be selectively locked to fix the relative pivotal position of the connected track.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
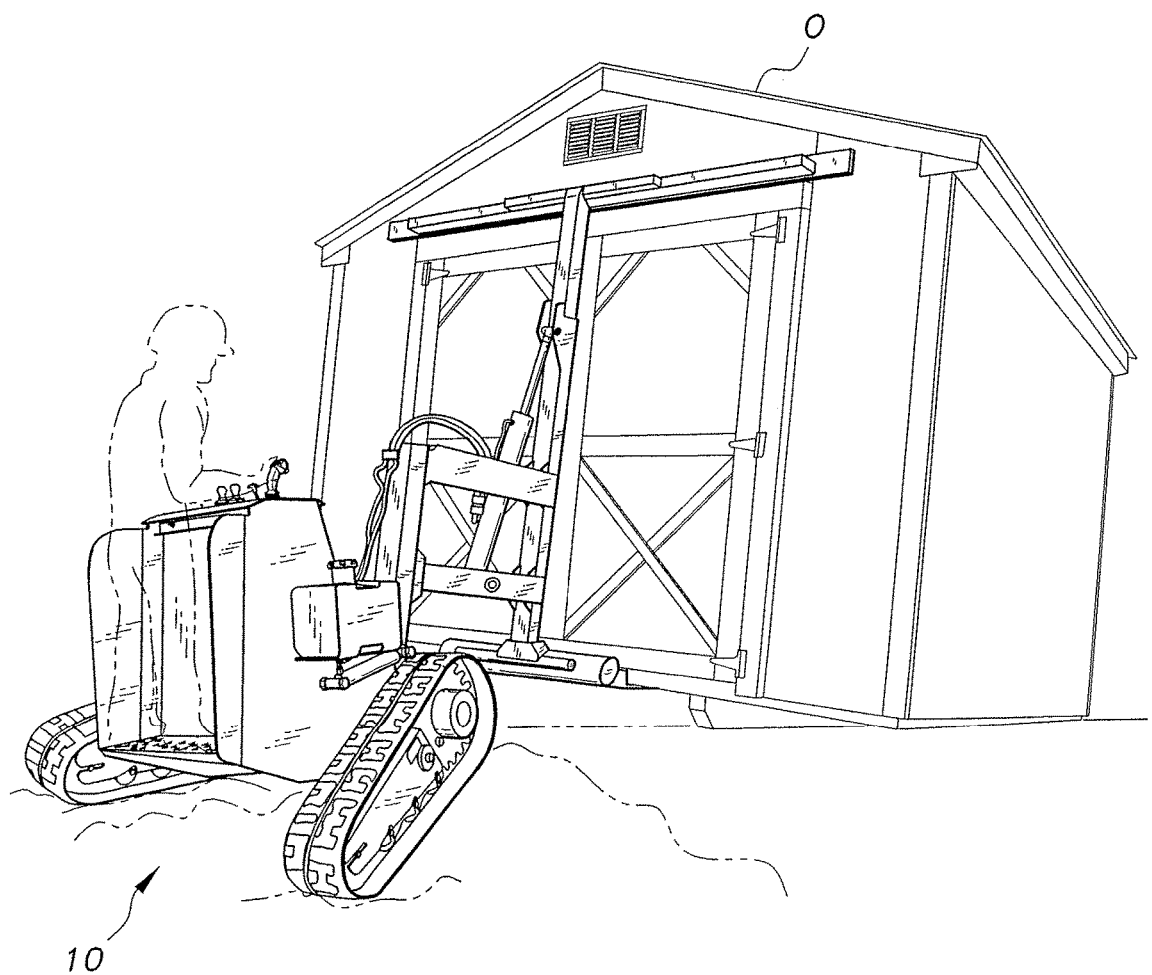
FIG. 1 is an environmental, perspective view of a powered hand truck with pivoting tracks.

The powered hand truck with pivoting tracks, generally referred to by the reference number 10 in the drawings, provides a mobile platform that conforms to uneven terrain while maintaining a relatively stable orientation for the object being moved. As best seen in FIGS. 1-4, the powered hand truck 10 includes a chassis 11 containing a power means, controls, and a steering system similar to those disclosed in the Borntrager et al. '522 patent. A forklift system 12 is coupled to the chassis 11 and enables selective lifting of objects O, such as a prefabricated hut or garage, as shown in FIG. 1, or any other relatively large object for subsequent transport.

To provide a more stable mobile platform, the powered hand truck 10 includes a pivoting track system 20. The track system 20 comprises a pair of elongate tracks mounted to opposite sides of the chassis 11. Each track is provided with a first subframe 21 supporting one or more idler rollers 23, a second subframe 22 disposed near the first subframe 21 and supporting a tension roller or sprocket 24, and a box frame 25 attached to and covering the first subframe 21 and the second subframe 22. An inner side, i.e., the side facing the chassis 11, of each box frame 25 includes an elongate support plate 27 for mounting a drive roller or sprocket 26 thereon. In a preferred embodiment, the support plate 27 is generally an elongate tear drop shaped plate having an enlarged, curved section about the same in curvature as the supported drive sprocket 26. An endless track belt 29 is trained around the drive sprocket 26 and the tension sprocket 24.

The first subframe 21 includes one or more pairs of spaced vertical slots 21a corresponding in number to the number of idler rollers 23 being supported by the first subframe 21. Each pair of slots 21a supports the axle of the corresponding idler roller 23 and enables the idler roller 23 to move in response to changes in terrain. The idler rollers 23 are preferably biased towards the ground to provide some tension to the endless track belt 29, as well as to facilitate conformation with the terrain being traversed.

The box frame 25 also includes one or more pairs of horizontal slots 25a supporting outer ends or portions of the axle of the tension sprocket 24 extending axially outward from the second subframe 22. The horizontal slots 25a enable slidable movement of the tension sprocket 24 for adjusting the tension on the track belt 29. Most moving belts require a suitable amount of tension in order to function properly, and the tension sprocket 24 facilitates such tensioning for the track belt 29 as the track belt 29 travels around the drive sprocket 26 and the tension sprocket 24. The tension sprocket 24 may be biased to push the tension sprocket 24 towards the opposite end of the track from the drive sprocket 26, or the tension sprocket 24 may be freely slidable along the slots 25a to enable manual adjustment. In either case, the adjusted position of the tension sprocket 24 may be fixed by suitable means, such as fasteners, lock pins, and the like disposed on the axle.

To drive the drive sprockets 24, each drive sprocket 24 includes a motor 28 coupled thereon. Each motor 28 is preferably coaxially mounted to the corresponding drive sprocket 24 and extend inwardly towards the chassis 11. Each motor 28 may also be operatively coupled to the controls on the chassis 11 for selective operation by the user.

The motor 28 is preferably a hydraulic motor. However, any type of motor may be employed, such as electric, fossil fuel, and the like, so long as the motor provides suitable performance.

By employing tracks as described above, the tracks provide a relatively wide and stable mobile platform for movement of the powered hand truck 10. The powered hand truck 10 also includes a pivoting assembly 30 for controlled pivoting of the tracks with respect to the chassis 11. This enables the tracks to conform to any changes in elevation to reduce much of the jarring effects experienced by conventional wheeled systems as they convey over bumps and small hills in the path of travel.

The pivoting assembly 30 includes a common pivot axle 31 extending through the body of the chassis 11 and each box frame 25 of the tracks. Each box frame 25 is pivotally mounted to an opposing end of the pivot axle, e.g., by a roller bearing or the like. This permits each track to pivot passively with respect to the chassis 11 independently of the other. To control the extent of pivoting movement of each track, the pivoting assembly 30 is provided with a pair of extendable control arms 32, each being mounted to an opposing side of the chassis 11. Each control arm 32 includes an elongate cylinder 33 with one end pivotally coupled to a side of the chassis 11 and a telescoping rod 34 extendable from the cylinder 32. A mounting tab or lug 27a extends outwardly from a peripheral edge of the large curved section of each support plate 27 of the box frame 25 near the corresponding drive sprocket 26 when assembled. The distal end of each telescoping rod 34 is pivotally attached to a corresponding mounting lug 27a.

Figure 2:
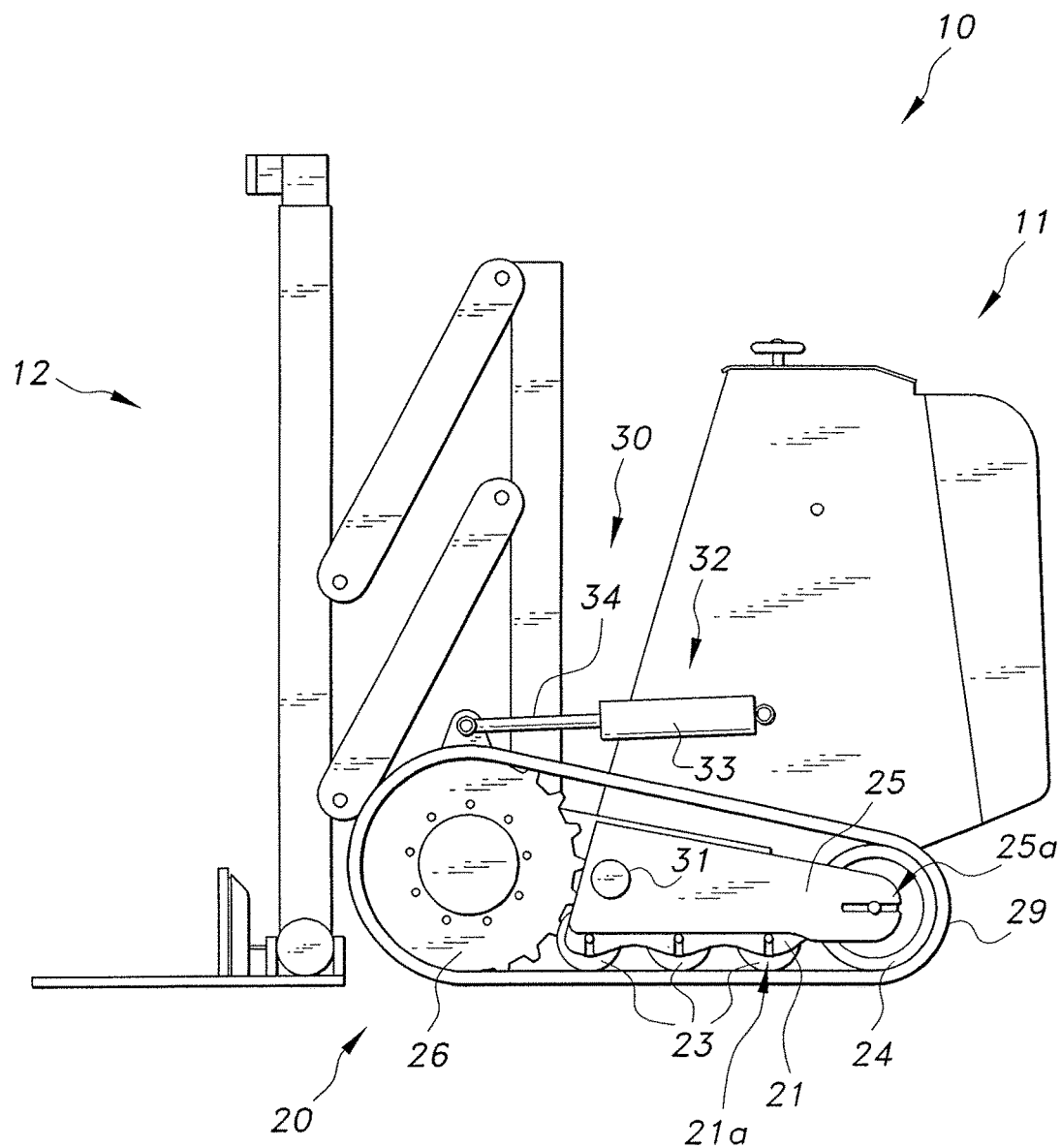
FIG. 2 is a side view of the powered hand truck of FIG. 1.
Figure 3:
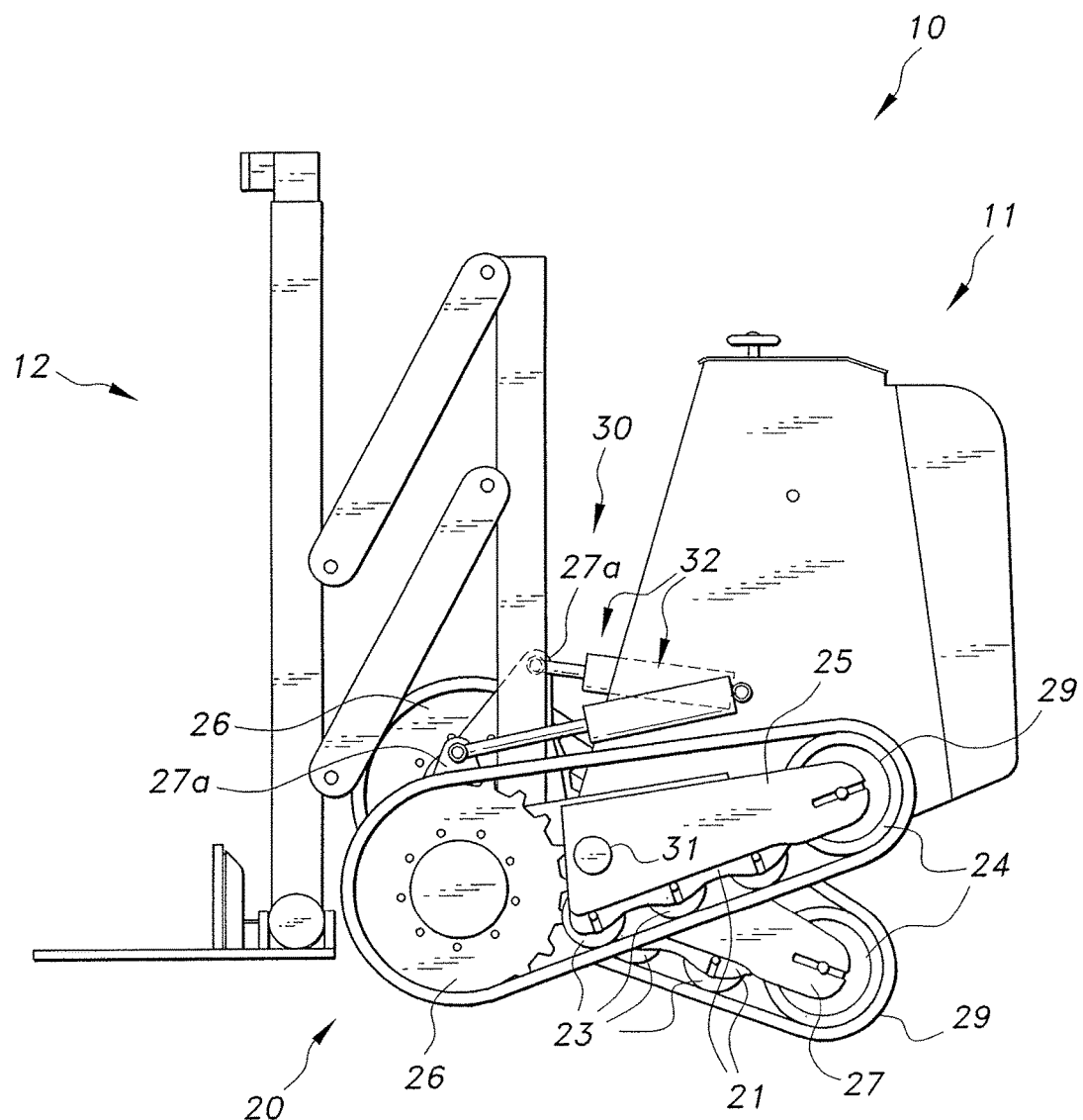
FIG. 3 is a side view of the powered hand truck of FIG. 1, shown with the tracks pivoted in opposite directions for traversing uneven hilly terrain.
Figure 4:
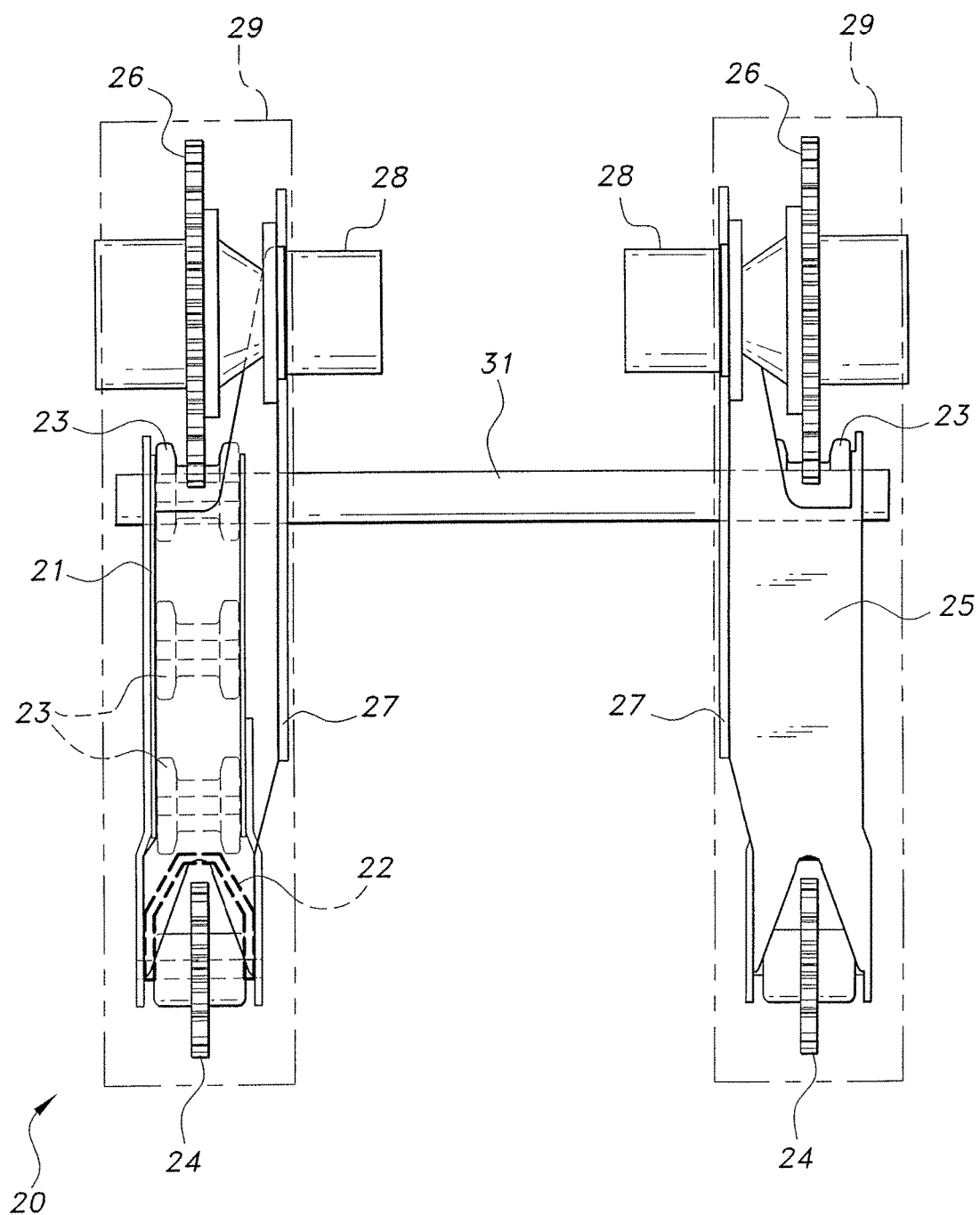
FIG. 4 is a top view of the track system for the powered hand truck of FIG. 1, where the right-hand track is shown with a box frame covering subframes and the left-hand track is shown with a top portion of the box frame removed to show details thereof.

By the above construction, the control arm 32 functions as a variable length lever that extends and retracts in response to the pivoting movements of the connected track, dampening pivotal movement of the track, which is best seen in FIGS. 2 and 3. Without the control arm 32, each track would be free to rotate completely about the common pivot axle 31. This may not be suitable or desirable for most applications. Thus, the control arms 32 limit the angular range of pivoting movement to a range more suitable for the types of terrain generally encountered by the powered hand truck 10. For the preferred construction, the control arm 32 is constructed from a pneumatic cylinder. However, other types of reciprocating cylinders, such as hydraulic cylinders, various gas cylinders, spring cylinders, and/or combinations thereof may be used. The control arms 32 each may also be selectively locked or fixed at any desired extended position, although the most often used position would be generally horizontal, as shown in FIG. 2.

Thus, it can be seen from the above description that the powered hand truck 10 with pivoting tracks presents a generally enhanced stable mobile platform. The pivoting tracks enable the powered hand truck 10 to traverse uneven terrain with relative ease while maintaining a relatively even keel with respect to the ground. The control arms 32 limit the pivot range so that each track does not rotate too far in any direction with respect to the chassis 11. To that extent, it can also be said that the control arms 32 function as a type of safety mechanism for the operation of the tracks.

It is to be understood that the present invention is not limited to the embodiments described above, but encompasses any and all embodiments within the scope of the following claims.

We claim:

1. A powered hand truck, comprising:
   a chassis having controls for operation of the powered hand truck and a common pivot axle;
   a forklift system attached to the chassis, the forklift system being adapted to lift objects for subsequent transport;
   a first elongate track and a second elongate track pivotally attached to opposing ends of the common pivot axle on opposite sides of the chassis, respectively, each of the tracks pivoting independently of the other; and
   a first extendable control arm and a second extendable control arm, each of the control arms having a first end and a second end, wherein each first end is connected to the chassis and each second end is connected to a corresponding one of the elongate tracks, the control arm dampening pivotal movement of the corresponding track and controlling the extent of the pivotal positioning of the corresponding track, further wherein each of the control arms may be selectively locked at the desired position.

2. The powered hand truck recited in claim 1, wherein each track comprises:
   a first subframe;
   one or more idler rollers supported by the first subframe;
   a second subframe;
   a tension sprocket supported by the second subframe;
   a frame attached to and covering the first subframe and the second subframe, the frame being pivotally attached to the pivot axle;
   a drive sprocket connected to the frame; and
   an endless track belt being trained around the drive sprocket and the tension sprocket.

3. The powered hand truck recited in claim 2, wherein each drive sprocket comprises a motor coupled thereto.

4. The powered hand truck recited in claim 2, wherein each first subframe further comprises:
   one or more pairs of vertical slots for slidably engaging an axle of a corresponding idler roller.

5. The powered hand truck recited in claim 2, wherein each frame includes one or more pairs of horizontal slots for slidably engaging an axle of the tension sprocket extending from the second subframe.

6. The powered hand truck recited in claim 2, wherein each control arm comprises an elongate cylinder and a telescoping rod, the telescoping rod extendable from the cylinder, a distal end of each telescoping rod being pivotally attached to a support plate of the respective frame.

7. The powered hand truck recited in claim 6, wherein each control arm comprises a pneumatic cylinder.

8. A powered hand truck, comprising:
   a chassis having controls for operation of the powered hand truck and a common pivot axle;
   a forklift system attach to the chassis, the forklift system being adapted to lift objects for subsequent transport; and
   a first elongate track and a second elongate track pivotally attached to opposing ends of the common pivot axle on opposite sides of the chassis, respectively, each of the tracks pivoting independently of the other, each track comprising:
   a first subframe,
   one or more idler rollers supported by the first subframe,
   a second subframe,
   a tension sprocket supported by the second subframe, and
   a box frame attached to and covering the first subframe and the second subframe, the box frame being pivotally attached to the pivot axle.

9. The powered hand truck recited in claim 8, further comprising:
 a first extendable control arm and a second extendable control arm, the control arms extending between opposite sides of the chassis and a corresponding one of the tracks, the control aim dampening pivotal movement of the corresponding track.

10. The powered hand truck recited in claim 8, wherein each drive sprocket comprises a motor coupled thereto.

11. The powered hand truck recited in claim 8, wherein each first subframe further comprises:
 one or more pairs of vertical slots for slidably engaging an axle of a corresponding idler roller.

12. The powered hand truck recited in claim 8, wherein each box frame includes one or more pairs of horizontal slots for slidably engaging an axle of the tension sprocket extending from the second subframe.

13. The powered hand truck recited in claim 8, wherein each control arm comprises an elongate cylinder and a telescoping rod, the telescoping rod extendable from the cylinder, a distal end of each telescoping rod being pivotally attached to the a support plate of the respective box frame.

14. A powered hand truck, comprising:
 a chassis having controls for operation of the powered hand truck and a common pivot axle;
 a forklift system attach to the chassis, the forklift system being adapted to lift objects for subsequent transport;
 a first elongate track and a second elongate track pivotally attached to opposing ends of the common pivot axle on opposite sides of the chassis, respectively, each of the tracks pivoting independently of the other, each track comprising:
  a first subframe,
  one or more idler rollers supported by the first subframe,
  a second subframe,
  a tension sprocket supported by the second subframe, and
  a box frame attached to and covering the first subframe and the second subframe, the box frame being pivotally attached to the pivot axle; and
 a first extendable control arm and a second extendable control arm, the control arms extending between opposite sides of the chassis and a corresponding one of the tracks, the control arm dampening pivotal movement of the corresponding track.

15. The powered hand truck recited in claim 14, wherein each first subframe further comprises:
 one or more pairs of vertical slots for slidably engaging an axle of a corresponding idler roller.

16. The powered hand truck recited in claim 14, wherein each box frame includes one or more pairs of horizontal slots for slidably engaging an axle of the tension sprocket extending from the second subframe.

17. The powered hand truck recited in claim 14, wherein each control arm comprises an elongate cylinder and a telescoping rod, the telescoping rod extendable from the cylinder.

18. The powered hand truck recited in claim 17, wherein each control arm comprises a pneumatic cylinder.

\* \* \* \* \*